INVENTOR
Pantaleon E. Miquelon.
BY
Harness, Dickey & Pierce
ATTORNEYS.

Oct. 17, 1944.   P. E. MIQUELON   2,360,786
UNIVERSAL JOINT ASSEMBLY
Filed May 11, 1942   2 Sheets-Sheet 2
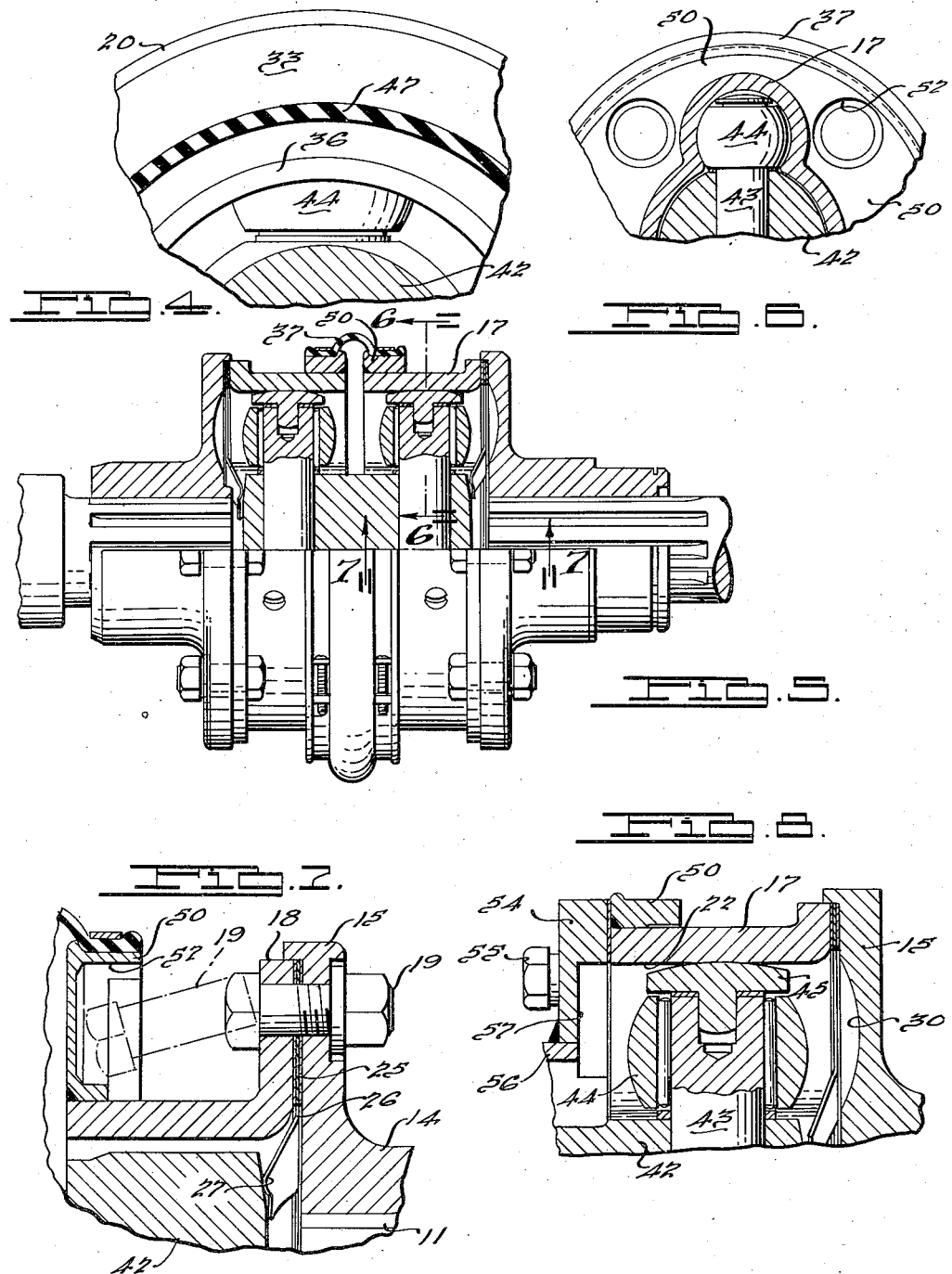
INVENTOR
Pantaleon E. Miquelon.
BY
Harness, Dickey & Pierce.
ATTORNEYS.

Patented Oct. 17, 1944

2,360,786

UNITED STATES PATENT OFFICE 2,360,786

UNIVERSAL JOINT ASSEMBLY

Pantaleon E. Miquelon, Dearborn, Mich., assignor to Universal Products Company Incorporated, Dearborn, Mich., a corporation of Delaware Application May 11, 1942, Serial No. 442,446

3 Claims. (Cl. 64—8)

The invention relates generally to joints and it has particular relation to improvements in universal joints for connecting shafts.

One object of the present invention is to provide an improved universal joint structure for connecting a pair of shafts which may be required to run in parallel but radially offset relation.

Another object of the invention is to provide a universal joint structure for accomplishing the aforesaid result which requires a minimum space axially of the shafts so that it may be used under conditions where only a small amount of space is permitted for accommodating a universal joint structure.

Another object of the invention is to provide a universal joint structure of great strength and durability although located in a small space axially of the shafts connected.

Another object of the invention is to provide an improved double universal joint arrangement wherein each joint is of the so-called two trunnion type.

Another object of the invention is to provide improvements in universal joint structures for the purposes mentioned, which can be manufactured and assembled efficiently and economically.

Other objects of the invention will become apparent from the following specification, from the drawings relating thereto, and from the claims hereinafter set forth.

For a better understanding of the invention, reference may be had to the drawings wherein:

Fig. 4 is a cross-sectional view on a larger scale taken substantially along the line 4—4 of Fig. 1;

Fig. 5 is a view similar to Fig. 1 but showing another form of the invention;

Fig. 6 is a cross-sectional view taken substantially along the line 6—6 of Fig. 5;

Fig. 7 is a cross-sectional view on a larger scale taken substantially along the line 7—7 of Fig. 5; and Fig. 8 is a fragmentary, cross-sectional view illustrating another form of the invention.

Figure 1:
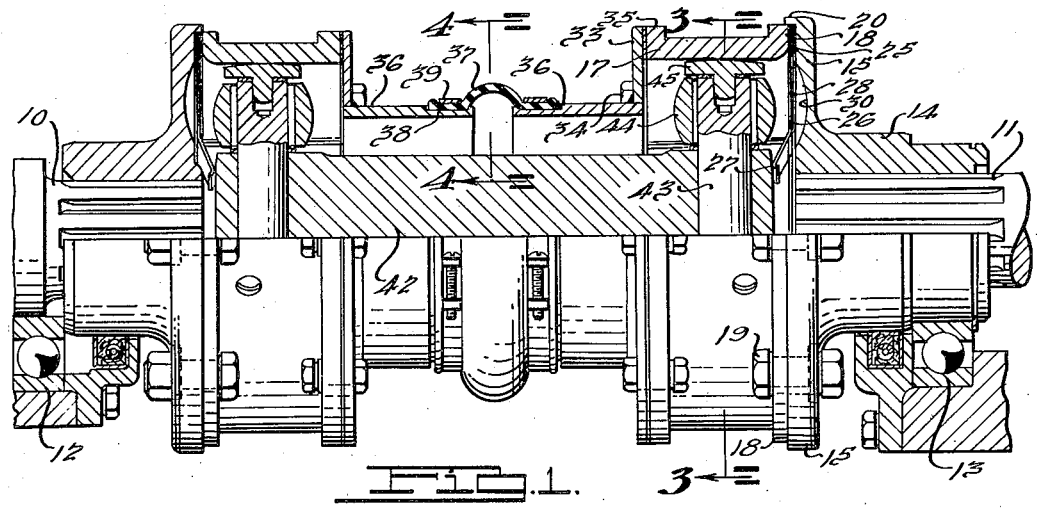
Figure 1 is an elevational view, partly in cross-section, of a universal joint arrangement as constructed according to one form of the invention.
Figure 3:
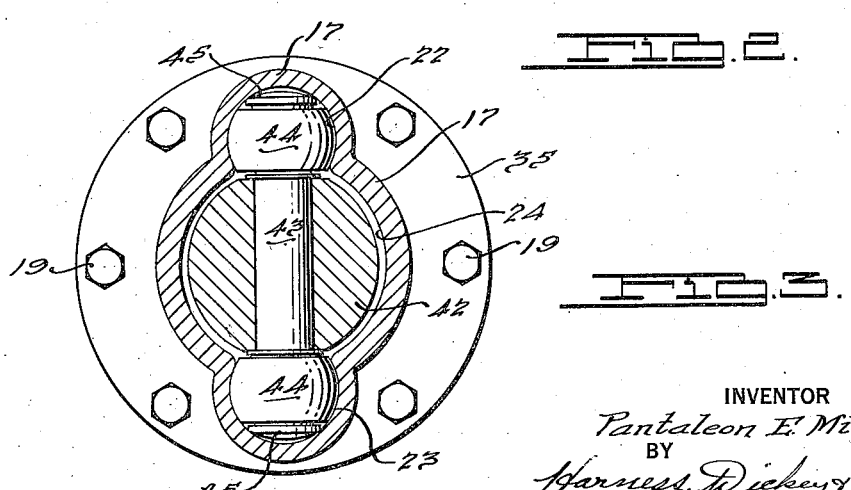
Fig. 3 is a cross-sectional view taken substantially along the line 3—3 of Fig. 1.

Referring to Fig. 1, the two shafts to be connected are indicated at 10 and 11 and these are mounted in suitable bearings as indicated at 12 and 13. The shaft 11 has a hub 14 drivingly mounted thereon and this hub has a circular flange 15 extending radially from its inner end. A housing 17 has an annular flange 18 which is fastened to the flange 15 by means of circumferentially spaced bolts 19 and for centering the housing on the flange 15, the latter has an annular shoulder 20 which extends over the periphery of the flange 18. As best shown by Fig. 3, the housing 17 is shaped to provide diametrically opposed guideways 22 and 23 and an intermediate passage 24 which is substantially larger than the guideways. Between the flanges 15 and 18, suitable gaskets 25 may be provided to prevent escape of the lubricant and also between the flanges, a sheet metal disc 26 is provided. This disc has resilient fingers 27 spaced circumferentially around its center and which are struck out from the body of the sheet. The purpose of these fingers will be mentioned presently. The plate 26 has openings 28 coinciding with the guideways 22 and 23 and the flange 15 in coinciding relation to the openings 28 has frusto-spherical cavities or recesses 30 which in effect elongate the guideways.

At the opposite end of the body 17, a circular plate 33 is fastened by bolts 34 to a circular flange 35 on the end of the body. The plate 33 extends radially inwardly for a substantial distance and is welded to a cylindrical sleeve 36 which extends axially of the shafts 10 and 11. It will be observed that the plate 33 may act as an end wall which extends over the ends of guideways 22 and 23.

An identical structure is fastened to the shaft 10 with corresponding numerals identifying like parts. Thus, two sleeve 36—36 extend towards each other although it will be observed that they are spaced axially a substantial distance. For sealing the space between the ends of these sleeves, a sealing band, which may comprise rubber as indicated at 37, extends around the ends of the sleeves and in order to prevent loosening of the band, its ends seat in shallow recesses 38 on both sleeves and adjustable clamps 39 positively hold the ends of the band in the recesses. It should be evident that this band permits either shaft with its housing and other parts connected thereto to move radially or at an angle with respect to the other shaft and the parts connected to it. Attention is directed to the fact that the plates 33 enable using smaller diameter sleeves 36 so as to reduce weight and metal required. Moreover, the sealing band may be smaller and grease will exert less centrifugal force against it.

A central connecting member 42 extends longitudinally in the sleeves 36 and opposite ends of this member project into the central passages 24 in the housings 17. Each end of this member has a diametrically extending pin 43 securely held in position and opposite ends of the pin are provided with ball elements and centering buttons indicated at 44 and 45 respectively. Details of the ball, buttons, and pin structure and their manner of cooperation with the guideway are more clearly disclosed and set forth in Warner Patent No. 1,921,274 dated August 8, 1933.

The resilient or spring fingers 27 on the end plates 26 are adapted to resiliently position the connecting member 42 axially of the joint assembly so as to prevent shifting of the member axially at least in an undesirable manner. In other words, the spring fingers tend to centralize the connecting member axially of the assembly while still permitting axial movement of the connecting member and other parts.

It will be apparent that the shafts can be pulled apart or away from each other a substantial distance and that the band 37 will allow such movement. It is likewise apparent that the shafts can be moved towards each other if necessary against the action of the spring fingers.

Figure 2:
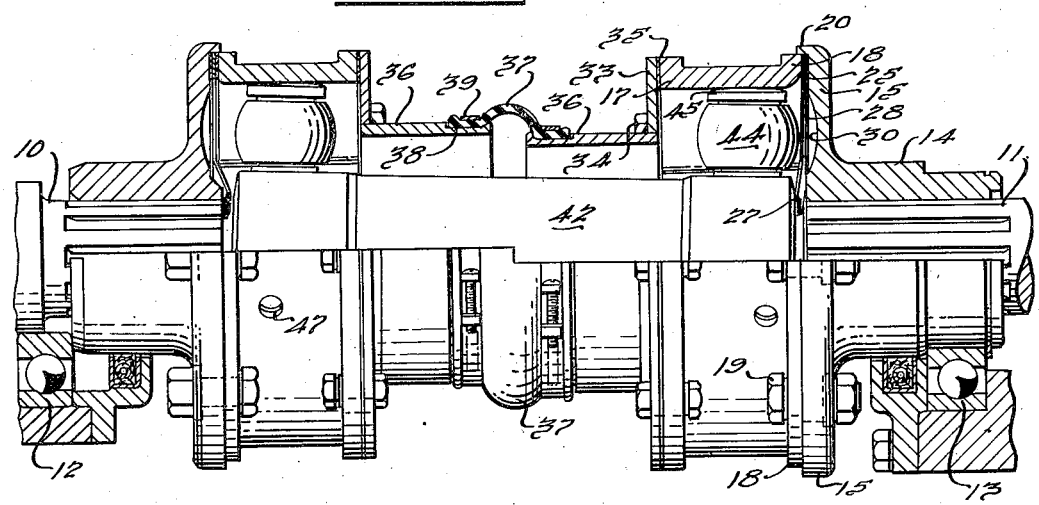
Fig. 2 is a view similar to Fig. 1 but illustrating the two shafts in parallel but radially offset relation one to the other.

Referring to Fig. 2, it is apparent that the shafts may be disposed in parallel but radially offset relatively and that under these circumstances, the connecting member and parts carried thereby will take an angled position as shown. This position is permitted by the spring fingers and it will be apparent that just as soon as the shafts again move to aligned positions, the fingers will act to restore the connecting member to approximately its normal and desired position. Furthermore, it will be apparent that the shafts can operate at an angle to each other and that the parts will take relative positions in accordance with the movements required. Finally, it might be noted that the entire assembly is enclosed so that lubricant cannot escape or foreign matter enter. A suitable opening may be provided in each housing for injecting lubricant and normally this opening will be closed by a screw-threaded plug 47.

Now referring to Figs. 5, 6, and 7, the structure shown is generally similar to that already described although generally the entire assembly is reduced in length axially of the shafts. The housings 17 in this structure instead of having integral flanges 35 as shown by Figs. 1 and 3, are provided with annular ring elements 50 which are welded to the housings. These ring elements, as best shown by Fig. 6, correspond in inner peripheral contour to the shape of the outer surface of the housing but the outer peripheral surface of the ring is circular so as to accommodate the sealing band 37. The housings 17 in this structure are shorter than that previously described and in order to enable insertion of the bolts employed for fastening the flanges 15 and 18 together, the ring 50 is provided with relatively deep and large openings 52 in alignment with the bolt holes. Insertion of the bolt is accomplished by disposing it first in the dotted line position in Fig. 7 so as to bring it into alignment with the bolt holes and during this manipulation a substantial and headed portion of the bolt extends into the recess 52. It will be apparent that the recesses 52 may be formed in the ring member before it is applied to and welded to the housing.

The structure shown in Figs. 5 and 7 lends itself also to accommodating an end plate element 54 which may be fastened to the ring 50 by means of bolts 55. This plate 54 at its radially inner edge is welded to a sleeve element 56 which may correspond to the sleeve element 36 shown in Fig. 1. The plate 54 may be generally similar to the plate 33 in Fig. 1 excepting that in this instance the side of the plate next to the guideway 22 is provided with recesses 57 so as to increase the effective length of the guideways.

It might be stated generally now in connection with Figs. 5 to 7, inclusive, that the structure shown takes practically a minimum of space in an axial direction so that the joint structure may be accommodated in places where space is extremely limited. With the housings axially shorter, the sleeves 36 omitted and the connecting member reduced in length, the dimensions of the structure may be readily brought within the axial dimensions allowed. While this advantage characterizes Fig. 5, it will be understood nevertheless that the structure shown by Fig. 5 may be used in connection with the plates 54, sleeves 56 shown in Fig. 8 in order to obtain a length for the structure which would be comparable to that shown by Fig. 1. Of course, in the structure shown by Fig. 8, the connecting member between the pins would be longer and on the order of the length of the connecting member in Fig. 1 and with respect to the length of the guideways, it will be apparent that the recesses 57 would compensate for the shorter length of the housing 17. Thus, the structure shown by Figs. 5, 6, 7, and 8 may be useful in variable locations, depending upon the axial length of the structure desired.

Although more than one form of the invention has been illustrated and described in detail, it will be apparent to those skilled in the art that various modifications may be made without departing from the scope of the appended claims.

What is claimed is:

1. A universal joint combination comprising a pair of joint housings adapted respectively to be connected to a pair of shafts and each having a central axial passage to be aligned with the shaft and a pair of axially extending guideways disposed at diametrically opposite sides of the passages and open thereto, a connecting member extending between the housings and having its ends projecting into the passages respectively, diametrically opposed drive means on each end of the member and extending into the guideways and being slidable therein, sleeve means joining the housings and extending over the connecting member, and resilient sheet metal elements on the housings at each end of the member so as to resiliently hold the latter substantially against shifting axially of the passages.

2. A universal joint combination comprising a pair of sleeve housings disposed in end to end relation and each having a central passage and diametrically offset guideway portions open to the passage, an annular ring around and fastened to the inner end of each housing and having a circular outer periphery and openings to fit the central passage portion and guideway portions of the housing, second housing sleeve elements between the first sleeve housings and fastened respectively to the rings, said second housing elements having adjacent cylindrical portions extending towards each other, flexible sealing means extending around such cylindrical portions for sealing the space between them, a connecting member extending between the housings and having its ends projecting into the passages, and diametrically opposed drive means on each end of the member and extending into the guideways.

3. A universal joint combination comprising a pair of sleeve housings disposed in end to end relation and each having a central passage and diametrically offset guideway portions open to the passage, an annular ring around and fastened to the inner end of each housing and having a circular outer periphery and openings to fit the central passage portion and guideway portions of the housing, second housing sleeve elements between the first sleeve housings and fastened respectively to the rings, said second housing elements having radial flanges for securing them to the rings and having cylindrical portions of reduced diameter extending towards each other, flexible sealing means extending around the adjacent ends of such cylindrical portions for sealing the space between them, a connecting member extending between the housings and having its ends projecting into the passages, and diametrically opposed drive means on each end of the member and extending into the guideways.

PANTALEON E. MIQUELON.